US010484033B1

(12) United States Patent
Li et al.

(10) Patent No.: US 10,484,033 B1
(45) Date of Patent: Nov. 19, 2019

(54) USER INTERFACE TO ENHANCE MILLIMETER WAVE (MMWAV) COMMUNICATIONS

(71) Applicant: QUALCOMM Incorporated, San Diego, CA (US)

(72) Inventors: Junyi Li, Chester, NJ (US); Vasanthan Raghavan, West Windsor Township, NJ (US); Juergen Cezanne, Ocean Township, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/054,766

(22) Filed: Aug. 3, 2018

(51) Int. Cl.
| *H04B 1/3827* | (2015.01) |
| *G08B 7/06* | (2006.01) |
| *G08B 21/18* | (2006.01) |
| *H04B 17/10* | (2015.01) |
| *G09B 19/24* | (2006.01) |

(52) U.S. Cl.
CPC ............ *H04B 1/3838* (2013.01); *G08B 7/06* (2013.01); *G08B 21/182* (2013.01); *G09B 19/24* (2013.01); *H04B 17/104* (2015.01); *H04B 2001/3844* (2013.01)

(58) Field of Classification Search
CPC ............... H04B 1/3838; H04B 17/104; H04B 2001/3844; G08B 7/06; G09B 19/24
USPC ........................................................ 455/155.1
See application file for complete search history.

(56) References Cited

U.S. PATENT DOCUMENTS

| 2003/0186728 | A1* | 10/2003 | Manjo | ................... | H01Q 1/243 |
| | | | | | 455/575.7 |
| 2009/0096683 | A1* | 4/2009 | Rosenblatt | ............. | H01Q 1/242 |
| | | | | | 343/702 |
| 2015/0179043 | A1* | 6/2015 | Gude | ................... | H04B 17/318 |
| | | | | | 455/226.2 |

* cited by examiner

*Primary Examiner* — Lee Nguyen
(74) *Attorney, Agent, or Firm* — Haynes and Boone, LLP

(57) ABSTRACT

Wireless communications systems and methods related to providing user interfaces to inform a user of an antenna signal blockage at a wireless communication device are provided. A wireless communication device receives information associated with at least one antenna of the wireless communication device indicating that a signal path of the at least one antenna is at least partially blocked by an object. The wireless communication device outputs, via a user interface of the wireless communication device, an indication that the signal path of the at least one antenna is at least partially blocked.

28 Claims, 7 Drawing Sheets

USER INTERFACE TO ENHANCE MILLIMETER WAVE (MMWAV) COMMUNICATIONS

TECHNICAL FIELD

This application relates to wireless communication systems, and more particularly to improving millimeter wave (mmWav) communications by allowing user cooperation in the event of an antenna signal blockage. Certain embodiments can enable and provide solutions and techniques for wireless communication devices to provide user interfaces for informing a user of an antenna signal blockage.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands.

While mmWave bands can provide a greater data throughput, mmWave bands have a significantly higher path loss compared to lower frequency bands used by conventional wireless communication systems. In addition, mmWave communications are sensitive to human body blockage. For example, a user may hold the wireless communication device by the user's hand while using the wireless communication device for communications. Depending on the hand position of the user, an antenna of the wireless communication device can be blocked by the user's hand. Human body blockage can lead to a high path loss in mmWav impacting link budget and signal quality.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of the present disclosure provide mechanisms for improving mmWav communications. For example, a wireless communication device includes user interfaces to inform a user of an antenna signal blockage upon a detection of an antenna or array of antennas of the wireless communication device blocked by an object (e.g., the user's hand). The user interface may include a visual indicator indicating an area on the wireless communication device where the antenna signal blockage is detected, an audio alert, a light alert, a vibration alert, and/or suggestions on how to orient (e.g., rotate and translate) the wireless communication device to avoid the antenna signal blockage. The user interfaces allow a user to take action to avoid the antenna signal blockage, and thus may improve signal quality in mmWav communications.

For example, in an aspect of the disclosure, a method includes receiving, by a wireless communication device, information associated with at least one antenna of the wireless communication device indicating that a signal path of the at least one antenna is at least partially blocked by an object. The method further includes outputting, by a user interface of the wireless communication device, an indication that the signal path of the at least one antenna is at least partially blocked.

In an additional aspect of the disclosure, a wireless communication device includes at least one antenna and a processor configured to receive information associated with the at least one antenna indicating that a signal path of the at least one antenna is at least partially blocked by an object. The wireless communication device further includes a user interface configured to output an indication that the signal path of the at least one antennas is at least partially blocked.

In an additional aspect of the disclosure, a computer-readable medium having program code recorded thereon, the program code includes code for causing a wireless communication device to receive information associated with at least one antenna of the wireless communication device indicating that a signal path of the at least one antenna is at least partially blocked by an object. The computer-readable medium further includes code for causing a user interface of the wireless communication device to output an indication that the signal path of the at least one antenna is at least partially blocked.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
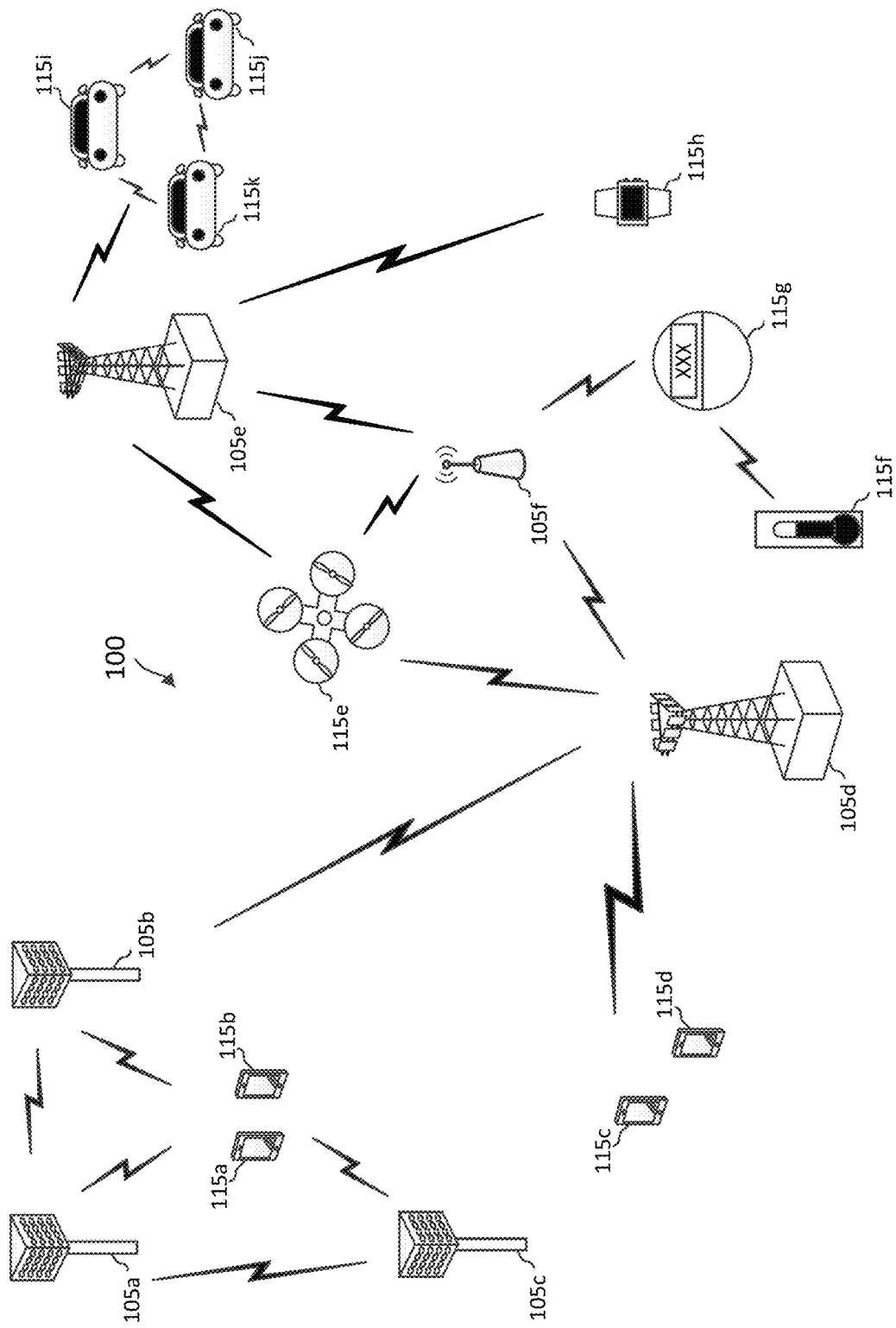
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for providing user interfaces to inform a user of an antenna signal blockage. For example, a wireless communication device includes an array of antennas positioned at various locations on the wireless communication device. The antennas are configured to transmit and/or receive radio frequency (RF) signals. Upon detecting a signal path of an antenna blocked by an object (e.g., a user's hand or any body part), the wireless communication device informs a user of the antenna signal blockage via user interfaces in various forms to allow a user to take action to avoid the antenna signal blockage. In an embodiment, the user interfaces include displaying a visual indicator on a display of the wireless communication device indicating the area of the antenna signal blockage. In an embodiment, the user interfaces include generating an audio signal, lighting up a light indicator on the wireless communication device, and/or causing the wireless communication device to vibrate. Upon receiving the antenna signal blockage indication, the user may position the wireless communication device to another position avoiding blocked area. Accordingly, the present disclosure can improve mmWav communications by allowing user cooperation.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

To facilitate communications in the network 100, the BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In some embodiments, the network 100 may operate over a mmWave band. The mmWave band may have a significantly higher path loss than a lower frequency non-mmWave band. To overcome the high path loss, the BSs 105 and the UEs 115 may include multiple antennas or antenna subarrays. The BSs 105 and the UEs 115 may apply beamforming (e.g., analog and/or digital beamforming) using the multiple antenna subarrays to generate narrow focused beams directing towards certain directions to communicate with each other. In other words, a BS 105 may transmit a signal to a UE 115 using a transmission beam directing to a direction of the UE 115. Similarly, the UE 115 may receive the signal from the BS 105 using a receive beam directing to a direction of the BS 105.

Figure 2:
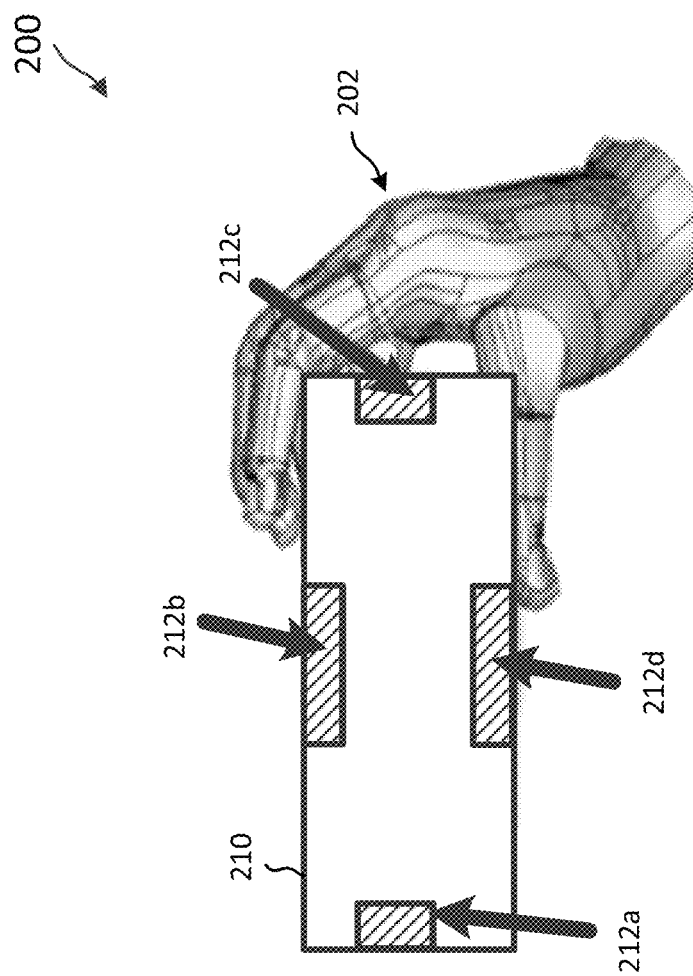
FIG. 2 illustrates an example of an antenna signal blockage scenario according to embodiments of the present disclosure.

FIG. 2 illustrates an example of an antenna signal blockage scenario 200 according to embodiments of the present disclosure. The scenario 200 may correspond to a scenario in the network 100. In the scenario 200, a user may hold a UE 210 by the user's hand 202 while using the UE 210 for communications. The UE 210 may correspond to a UE 115 in the network 100. The UE 210 may include a plurality of antenna subarrays 212 arranged at various locations on the UE 210. Each antenna subarray 212 may include multiple antennas or antenna elements that operate together as a single antenna to produce narrow focused beams. For simplicity of illustration and discussion, the UE 210 is illustrated with four antenna subarrays 212a, 212b, 212c, and 212d. However, the UE 210 may be alternatively configured to include any suitable number of antenna subarrays 212 (e.g., about 2, 3, 5, 6 or more) and the antenna subcarrays may be positioned at any suitable locations on the UE 210.

As shown, the user's hand 202 is positioned adjacent to the antenna subarray 212c. The user's hand 202 can create a high path loss for signals transmitted by the antenna subarray 212c and/or signals received from the antenna subarray 212c. Thus, signal transmissions from the antenna subarray 212c and signal receptions at the antenna subarray 212c may have low signal qualities.

In an embodiment, the UE 210 may include a radio frequency (RF) signal detection module configured to detect signal blockage at an antenna subarray 212 of the UE 210. For example, the RF signal detection module may include sensors that can detect an object in proximity to an antenna subarray 212. Alternatively, the RF signal detection module may include circuitries configured to monitor transmit signal power and/or received signal power at the antenna subarrays 212. The RF signal detection module can determine a signal blockage based on the monitored signal power, for example, falling below a certain threshold.

Upon detecting a signal path of an antenna subarray 212 being at least partially blocked, for example, by a user hand 202, the UE 210 may be configured to use another antenna subarray 212 for transmissions. For example, when the signal path of the antenna subarray 212c is blocked, the UE 210 may switch to use another antenna subarray 212 (e.g., the antenna subarrays 212b, or 212d for transmissions.

Alternatively, UE 210 may increase the transmit power at the antenna subarray 212c to compensate for the higher path loss caused by the blockage. However, transmissions in the mmWav frequencies may have potential health impacts to human bodies. Thus, certain regulatory organizations, such as Federal Communications Commission (FCC) and International Commission on Non-Ionizing Radiation Protection (ICNIRP), impose maximum permissible exposure (MPE) constraints on transmitters at various carrier frequencies. MPE constraints are typically specified in terms of short-term temporal averaging of radiated power, medium-term temporal averaging of radiated power, local-spatial averaging of radiated power, and/or medium-spatial averaging of radiated power. The imposing of the MPE constraints can prevent hazardous operating conditions, ensure users' health, and/or reduce electromagnetic pollution or noise from mmWave transmissions. Thus, while the UE 210 may increase the transmission power at the blocked antenna subarray 212c, the UE 210 is required to conform to MPE constraints imposed by regulatory organizations. As such, the UE 210 may not be able to increase the transmission power by a sufficient amount to overcome the high path loss caused by the user's hand 202.

The present disclosure provides techniques to allow user cooperation in improving mmWav communications by providing user interfaces to inform a user of a mobile device (e.g., the UEs 115 and 210) that a certain antenna on the mobile device is blocked. As such, the user can orient or reposition the mobile device to avoid the antenna signal blockage. For example, the user may orient the mobile device by rotating the mobile device along one or more axes or translating the mobile device along one or more axes. The present disclosure may additionally provide suggestions on how to reposition the mobile devices to avoid the signal blockage.

Figure 3:
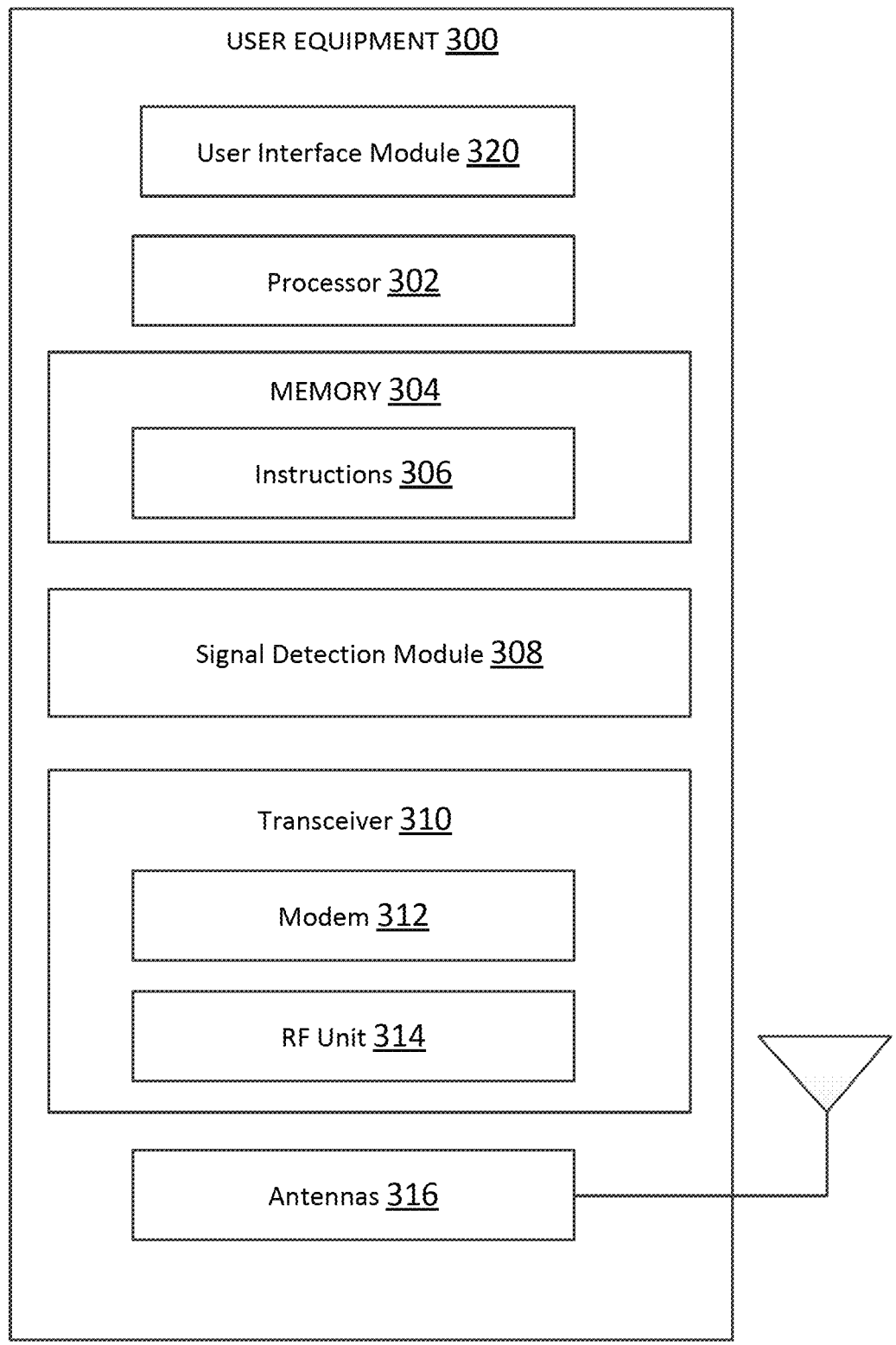
FIG. 3 is a block diagram of a user equipment (UE) according to some embodiments of the present disclosure.

FIG. 3 is a block diagram of an exemplary UE 300 according to embodiments of the present disclosure. The UE 300 may be a UE 115 or a UE 210 as discussed above. As shown, the UE 300 may include a processor 302, a memory 304, a signal detection module 308, a transceiver 310 including a modem subsystem 312 and a radio frequency (RF) unit 314, one or more antennas 316, and a user interface module 320. These elements may be in direct or indirect communication with each other, for example via one or more buses. The antennas 316 may be substantially similar to the antenna subarrays 212.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc.

"Instructions" and "code" may include a single computer-readable statement or many computer-readable statements.

The signal detection module 308 may be implemented via hardware, software, or combinations thereof. For example, the signal detection module 308 may be implemented as a processor, circuit, and/or instructions 306 stored in the memory 304 and executed by the processor 302. The signal detection module 308 may be used for various aspects of the present disclosure. For example, the signal detection module 308 is configured to monitor transmissions and/or receptions at the antennas 316, sensing objects in proximity to the antennas 316, determine whether a signal path of an antenna 316 is blocked (e.g., by an object in proximity to the antenna 316) based on the monitoring and/or sensing, provide information (e.g., geometry of the UE 300 and the location of the antenna 316 on the UE 300 that is under signal blockage) associated with the antenna 316 under a signal blockage to the user interface 3 module 20, request the user interface module 320 to inform a user of the signal blockage, and/or provide suggestions to move the UE 300 away from the signal blockage, as described in greater detail herein.

The user interface module 320 may be implemented via hardware, software, or combinations thereof. For example, the user interface module 320 may be implemented as a processor, circuit, and/or instructions 306 stored in the memory 304 and executed by the processor 302. In an embodiment, the user interface module 320 may include a display that can provide visual display to a user. The display may be a touchscreen configured to display and receive inputs from a user. In an embodiment, the user interface module 320 may include an audio speaker configured to generate an audio signal to inform a user of an antenna signal blockage. In an embodiment, the user interface module 320 may include a vibration component configured to generate a vibrating effect on the UE 300 (e.g., causing the UE 300 to vibrate) to inform a user of an antenna signal blockage. In an embodiment, the user interface module 320 may include a light indication component (e.g., a light emitting diode (LED)) located on a housing of the UE 300. The light indication component can be light up to inform a user of an antenna signal blockage. The user interface module 320 can include any combinations of the display, audio speaker, vibration component, the light indication component, and/or any other components for alerting a user of an antenna signal blockage.

The user interface module 320 is configured to receive information from the signal detection module 308 associated with signal blockages at the antennas 316, inform a user of an antenna 316 experiencing a signal blockage based on the received information (e.g., via display, audio signals, light indication, and/or vibration effect), receive instructions from the signal detection module 308 on how to move the UE 300 away from the signal blockage, and/or inform a user of the instructions (e.g., via display, audio signals, light indication, and/or vibration effect), as described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas or antenna arrays and antenna subarrays similar to the antenna subarrays 212 of similar or different designs in order to sustain multiple transmission links. The RF unit 314 may configure the antennas 316.

While FIG. 3 illustrates that the signal detection module 308 as a separate module from the RF unit 314, in some embodiments, the signal detection module 308 may be implemented as part of the RF unit 314. In some embodiments, the RF unit 314 integrated with the signal detection module 308 may be referred to as an RF integrated circuitry (RFIC) component. In addition, the antenna signal blockage detection mechanisms and/or the user interface mechanisms can be implemented across multiple modules in the UE 300 or implemented by a single module to achieve substantially similar functionalities.

Figure 4:
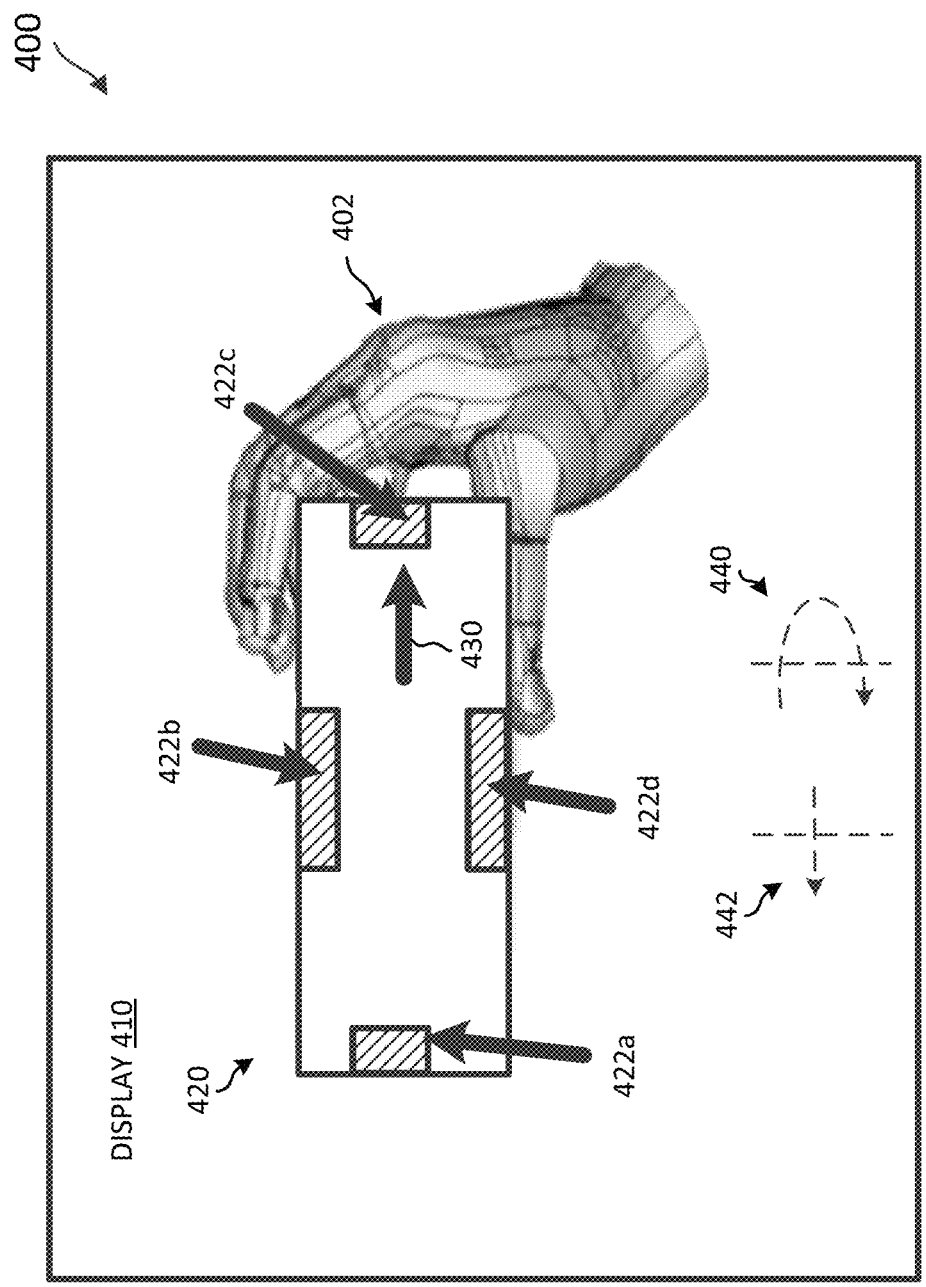
FIG. 4 illustrates a user interface method for indicating an antenna signal blockage according to some embodiments of the present disclosure.

FIG. 4 illustrates a user interface 400 for indicating an antenna signal blockage according to some embodiments of the present disclosure. The user interface 400 may be employed by a UE such as the UEs 115, 210, and 300. In particular, the user interface 400 may be implemented by the user interface module 320 to inform a user of the UE of a signal blockage at an antenna (e.g., the antennas 316 or antenna subarrays 212) of the UE. The user interface 400 includes a display 410. The display 410 may correspond to a display on the UE 210 of FIG. 2. The display 410 shows a graphical representation 420 of the UE 210, for example, based on dimensional parameters and/or the geometry of the UE 210. As shown, the display 410 shows a top-side view of the UE 210. The graphical representation 420 may include markers 422 indicating the locations of the antenna subarrays 212 on the UE 210, for example, with respect to the dimensions or geometry of the UE 210. For example, the marker 422a, 422b, 422c, and 422d correspond to the locations of the antenna subarrays 212a, 212b, 212c, and 212d, respectively. In some embodiments, the display 410 may show a side-view, a bottom-view, and/or a perspective view of the UE 210, for example, depending on the locations of the antenna subarrays 212.

Following the example from the scenario 200, where the signal path of the antenna subarray 212c is blocked by the user's hand 202, the display 410 can include a visual indicator 430 indicating that the signal path of the antenna subarray 212c is at least partially blocked. The visual indicator 430 may include an arrow (e.g., in a red color) pointing to the blocked area (e.g., the marker 422c corresponding to the blocked antenna subarray 212c) as shown or may use any other suitable visual format for the indication. In some embodiments, the display 410 may optionally display an object 402 (e.g., the user's hand 202) detected in proximity to the blocked antenna subarray 212c.

In some embodiments, the display 410 may display instructions for orienting or repositioning the UE 210 to avoid the signal blockage at the antenna subarray 212*c*. For example, the display 410 may indicate a rotation 440 along an axis of the UE 210 and/or a translation 442 along an axis of the UE 210. Alternatively, the display 410 may display an instruction instructing the user to move the user's hand 202 to another position to avoid the signal blockage at the antenna subarray 212*c*.

In an embodiment, the user interface 400 may receive, from a signal detection module (e.g., the signal detection module 308) of the UE 210, parameters associated with the dimensions and/or the geometry of the UE 210, locations of the blocked antenna subarray 212*c* with respect to the UE 210, and/or instructions for orienting the UE 210 to avoid a signal blockage.

Accordingly, the present disclosure allows a user to reposition the UE 210 in the event of an antenna signal blockage based on the visual indicators 430 and/or the repositioning instructions (e.g., the rotation 440 and/or the translation 442).

Figure 5:
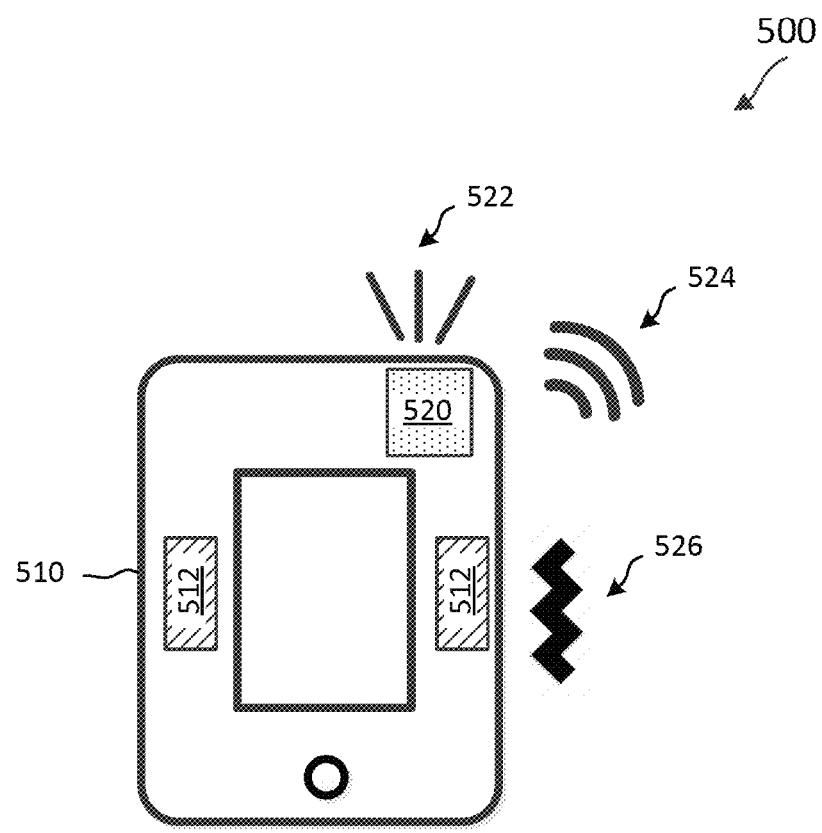
FIG. 5 illustrates a user interface method for indicating an antenna signal blockage according to some embodiments of the present disclosure.

FIG. 5 illustrates a user interface method 500 for indicating an antenna signal blockage according to some embodiments of the present disclosure. The method 500 may be employed by a UE such as the UEs 115, 210, and 300. The method 500 includes a UE 510 similar to the UEs 115, 210, and 300. The UE 510 may include a plurality of antennas 512 and a user alert module 520. The antennas 512 may be substantially similar to the antenna subarrays 212 and the antennas 316. The user alert module 520 may be substantially similar to the user interface module 320. The user alert module 520 may include circuitries and/or one or more LEDs configured to emit a light signal 522 to alert a user that a signal path of an antenna 512 is at least partially blocked. The user alert module 520 may include circuitries and/or one or more audio speakers configured to generate an audio signal 524 to alert a user that a signal path of an antenna 512 is at least partially blocked. The user alert module 520 may include a vibration component (e.g., a vibration motor) configured to generate a vibration 526 at the UE 210 to alert a user that a signal path of an antenna 512 is at least partially blocked.

Figure 6:
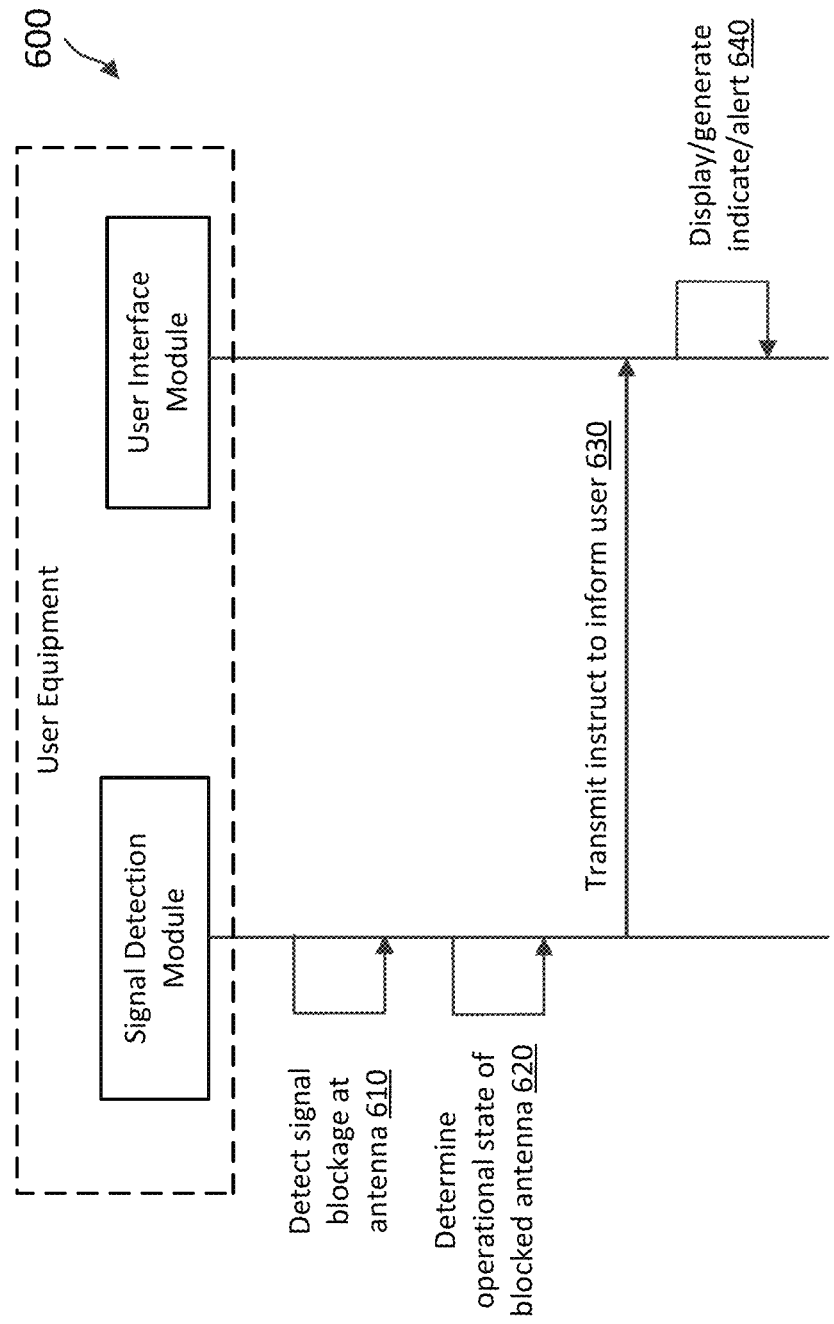
FIG. 6 is a signaling diagram of a user interface method for indicating an antenna signal blockage according to some embodiments of the present disclosure.

Accordingly, the present disclosure can prompt a user to reposition the UE 210 in the event of an antenna signal blockage based on the light signal 522, the audio signal 524, and/or the vibration 526, FIG. 6 is a signaling diagram of a user interface method for indicating an antenna signal blockage according to some embodiments of the present disclosure. The method 600 is implemented by a UE such as the UEs 115, 210, 300, and 510. Steps of the method 600 can be executed by computing devices (e.g., a processor, processing circuit, and/or other suitable component) of the UE. For example, the method 600 can be implemented by a signal detection module (e.g., the signal detection module 308) at the UE and a user interface module (e.g., the user interface module 320 and the user alert module 520) at the UE. As illustrated, the method 600 includes a number of enumerated steps, but embodiments of the method 600 may include additional steps before, after, and in between the enumerated steps. In some embodiments, one or more of the enumerated steps may be omitted or performed in a different order.

At step 610, the signal detection module detects a signal blockage at an antenna (e.g., the antenna subarrays 212, the antennas 316 and 512) of the UE. For example, the signal detection module may monitor transmit signal powers and/or received signal powers at all antennas of the UE and may determine a signal path of an antenna is blocked when a transmit signal power and/or a receive signal power falls below a certain threshold. Alternatively, the signal detection module may include a sensor configured to sense an object in a close proximity to an antenna of the UE.

At step 620, the signal detection module determines whether the blocked antenna is in an active operational state (e.g., in an active transmission and/or an active reception).

At step 630, when determining that the blocked antenna is in an active operational state, the signal detection module transmits an instruction to the user interface module to inform a user that a signal path of an antenna at the UE is at least partially blocked by an object (e.g., the user's hand 202). The instruction may include design parameters of the UE, for example, including geometric parameters of the UE and/or arrangements of the antennas at the UE (e.g., positions of the antennas with respect to the UE). In some embodiments, the design parameters of the UE may be stored in a memory (e.g., the memory 304) of the UE and the instruction may include an indication of a certain antenna that is blocked by an object. The user interface module may read the UE's design parameters from memory.

At step 640, upon receiving the instruction, the user interface module informs a user of the signal blockage at the antenna based on the instruction. The user interface module may display information of the blocked antenna as shown in the display 410. The user interface module may generate a light indication (e.g., the light signal 522), a sound or a noise (e.g., the audio signal 524), and/or a vibration (e.g., the vibration 526) at the UE to alert a user that a signal path of an antenna at the UE is at least partially blocked. The user may respond by holding the UE at a different hand position to avoid the signal blockage.

In some embodiments, the step 620 may be optional. In some embodiments, when the signal detection module determines that the blocked antenna is not in an active operational state, the signal detection module may not send the instruction to the user interface at step 630.

While the method 600 illustrates the communications between two modules, the signal detection module and the user interface module, in some embodiments, the method 600 may be implemented by a single module or more than two modules at the UE.

Figure 7:
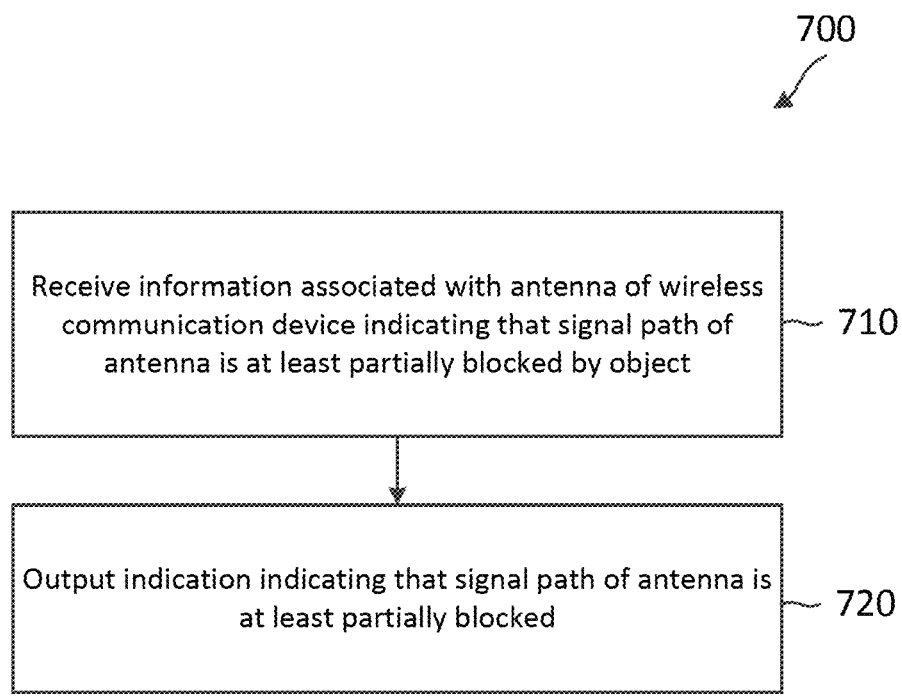
FIG. 7 is a flow diagram of a user interface method for indicating an antenna signal blockage according to some embodiments of the present disclosure.

FIG. 7 is a flow diagram of a user interface method for indicating an antenna signal blockage according to some embodiments of the present disclosure. Steps of the method 700 can be executed by a computing device (e.g., a processor, processing circuit, and/or other suitable component) of a wireless communication device, such as the UEs 115, 210, 300 and 510. The method 700 may employ similar mechanisms as described in the user interface 400 and the methods 500 and 600 described above with respect to FIGS. 4, 5, and 6, respectively. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 710, the method 700 includes receiving, by the wireless communication device, information associated with at least one antenna (e.g., the antenna subarrays 212 and the antennas 316 and 512) of the wireless communication device indicating that a signal path of the at least one antenna (e.g., the antenna subarray 212*c*) is at least partially blocked by an object (e.g., the user's hand 202). In an embodiment, the wireless communication device may include an array of antennas and the information may indicate that at least one of the antennas in the array is partially blocked by the object. In an embodiment, the at least one antenna operates in a mmWav band. In an embodiment, the information is received from an RFIC component (e.g., the RF unit 314 integrated with the signal detection module 308) of the wireless communication device.

At step 720, the method 700 includes outputting, by a user interface (e.g., the user interface module 320, the display 410, and the user alert module 520) of the wireless communication device, an indication that the signal path of the at least one antenna is at least partially blocked.

In an embodiment, the method 700 may output the indication by displaying a visual indicator (e.g., the visual indicator 430) indicating a position of the at least one antenna. The method 700 may display a graphical representation (e.g., the graphical representation 420) of the wireless communication device with the visual indicator indicating the position (e.g., the markers 422) of the at least one antenna on the graphical representation of the wireless communication device.

In an embodiment, the method 700 may receive the information by receiving at least one of a first parameter associated with a geometry of the wireless communication device or a second parameter associated with the position of the at least one antenna with respect to the geometry of the wireless communication device. For example, the first parameter may include a length parameter, a width parameter, and/or a height parameter so that the user interface can display a top-view, a bottom-view, a side-view, and/or a perspective view of the wireless communication device. The second parameter may include coordinate information with respect to a corresponding view of the wireless communication device. The display may be based on at least one of the first parameter or the second parameter.

In an embodiment, the method 700 may output the indication by generating an audio alert (e.g., the audio signal 524) to indicate that the signal path of the at least one antenna is at least partially blocked. In an embodiment, the method 700 may output the indication by generating a vibration alert (e.g., the vibration 526) to indicate that the signal path of the at least one antenna is at least partially blocked. In an embodiment, the method 700 may output the indication by generating a light alert (e.g., the light signal 522) to indicate that the signal path of the at least one antenna is at least partially blocked.

In an embodiment, the method 700 can include receiving an instruction to orient or reposition the wireless communication device such that the signal path of the at least one antenna is not blocked by the object. The method 700 can include displaying, by the user interface of the wireless communication device, the instruction to orient the wireless communication device. The instruction may include at least one of an instruction to rotate (e.g., the rotation 440) the wireless communication device along one or more axes or an instruction to translate (e.g., the translation 442) the wireless communication device along one or more axes.

In an embodiment, the method 700 can output the indication further based on a determination that the at least one antenna is in an active operational state (e.g., in an active transmission or an active reception). In other words, when the blocked antenna is not actively used for transmission and/or reception, the method 700 may not output the indication.

Embodiments of the present disclosure further include a wireless communication device comprising means (e.g., the processor 302 and the user interface 320) for receiving information associated with at least one antenna of the wireless communication device indicating that a signal path of the at least one antenna is at least partially blocked by an object; and means (e.g., the user interface 320) for outputting an indication that the signal path of the at least one antennas is at least partially blocked.

In some embodiments, wherein the at least one antenna is an antenna in an array of antennas. In some embodiments, wherein the at least one antenna is configured to operate in a millimeter wave (mmWav) band. In some embodiments, the means for outputting the indication is further configured to output the indication by displaying a visual indicator indicating a position of the at least one antenna. In some embodiments, the means for outputting the indication is further configured to output the indication by displaying a graphical representation of the wireless communication device with the visual indicator indicating the position of the at least one antenna on the graphical representation of the wireless communication device. In some embodiments, the information includes at least one of a first parameter associated with a geometry of the wireless communication device or a second parameter associated with the position of the at least one antenna with respect to the geometry of the wireless communication device, and wherein the means for outputting the indication is further configured to output the indication by displaying the graphical representation of the wireless communication device with the visual indicator based on at least one of the first parameter or the second parameter. In some embodiments, the means for outputting the indication is further configured to output the indication by generating an audio alert to indicate that the signal path of the at least one antenna is at least partially blocked. In some embodiments, the means for outputting the indication is further configured to output the indication by generating a vibration alert to indicate that the signal path of the at least one antenna is at least partially blocked. In some embodiments, the means for outputting the indication is further configured to output the indication by generating a light alert to indicate that the signal path of the at least one antenna is at least partially blocked. In some embodiments, the wireless communication device further includes means (e.g., the processor 302 and the user interface 320) for receiving an instruction to orient the wireless communication device such that the signal path of the at least one antenna is not blocked by the object, and wherein the means for outputting the indication is further configured to output the indication by displaying the instruction. In some embodiments, wherein the instruction includes at least one of an instruction to rotate the wireless communication device along one or more axes; or an instruction to translate the wireless communication device along one or more axes. In some embodiments, the means for outputting the indication is further configured to output the indication based on a determination that the at least one antenna is in an active operational state.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, the method comprising:
   receiving, by a wireless communication device, information associated with at least one antenna of the wireless communication device indicating that a signal path of the at least one antenna is at least partially blocked by an object; and
   outputting, by a user interface of the wireless communication device, an indication that the signal path of the at least one antenna is at least partially blocked, the indication including at least one of a first instruction to rotate the wireless communication device along one or more axes or a second instruction to translate the wireless communication device along one or more axes.

2. The method of claim 1, wherein the outputting includes:
   displaying, by the user interface of the wireless communication device, a visual indicator indicating a position of the at least one antenna.

3. The method of claim 2, wherein the outputting includes:
   displaying, by the user interface of the wireless communication device, a graphical representation of the wireless communication device with the visual indicator indicating the position of the at least one antenna on the graphical representation of the wireless communication device.

4. The method of claim 3, wherein the receiving includes:
   receiving, by the wireless communication device, at least one of a first parameter associated with a geometry of the wireless communication device or a second parameter associated with the position of the at least one antenna with respect to the geometry of the wireless communication device,
   wherein the displaying is based on at least one of the first parameter or the second parameter.

5. The method of claim 1, wherein the outputting includes:
   generating, by the user interface of the wireless communication device, an audio alert to indicate that the signal path of the at least one antenna is at least partially blocked.

6. The method of claim 1, wherein the outputting includes:
   generating, by the user interface of the wireless communication device, a vibration alert to indicate that the signal path of the at least one antenna is at least partially blocked.

7. The method of claim 1, wherein the outputting includes:
   generating, by the user interface of the wireless communication device, a light alert to indicate that the signal path of the at least one antenna is at least partially blocked.

8. The method of claim 1, further comprising:
   receiving, by the wireless communication device, an instruction to orient the wireless communication device such that the signal path of the at least one antenna is not blocked by the object, the instruction including at least one of the first instruction or the second instruction; and
   displaying, by the user interface of the wireless communication device, the instruction to orient the wireless communication device.

9. The method of claim 1, wherein the outputting is further based on a determination that the at least one antenna is in an active operational state.

10. The method of claim 1, wherein the receiving includes:
    receiving, by the wireless communication device, the information associated with an array of antennas including the at least one antenna, the information indicating that the signal path of the array of antennas is at least partially blocked.

11. The method of claim 1, wherein the receiving includes:
    receiving, by the wireless communication device, the information from a radio frequency integrated circuitry (RFIC) component of the wireless communication device, the RFIC component including the at least one antenna.

12. A wireless communication device comprising:
    at least one antenna;
    a processor configured to receive information associated with the at least one antenna indicating that a signal path of the at least one antenna is at least partially blocked by an object; and
    a user interface configured to output an indication that the signal path of the at least one antennas is at least partially blocked, the indication including at least one of a first instruction to rotate the wireless communication device along one or more axes or a second instruction to translate the wireless communication device along one or more axes.

13. The wireless communication device of claim 12, further comprising an array of antennas including the at least one antenna, wherein the information further indicates that a signal path of the array of antennas is at least partially blocked.

14. The wireless communication device of claim 12, wherein the at least one antenna operates in a millimeter wave (mmWav) band.

15. The wireless communication device of claim 12, wherein the user interface is further configured to output the indication by:
    displaying a visual indicator indicating a position of the at least one antenna.

16. The wireless communication device of claim 15, wherein the user interface is further configured to output the indication by:
    displaying a graphical representation of the wireless communication device with the visual indicator indicating the position of the at least one antenna on the graphical representation of the wireless communication device.

17. The wireless communication device of claim 16, wherein the information includes at least one of:
    a first parameter associated with a geometry of the wireless communication device; or
    a second parameter associated with the position of the at least one antenna with respect to the geometry of the wireless communication device, and
    wherein the user interface is further configured to output the indication by:
        displaying the graphical representation of the wireless communication device with the visual indicator based on at least one of the first parameter or the second parameter.

18. The wireless communication device of claim 12, wherein the user interface is further configured to output the indication by:
    generating an audio alert to indicate that the signal path of the at least one antenna is at least partially blocked.

19. The wireless communication device of claim 12, wherein the user interface is further configured to output the indication by:
    generating a vibration alert to indicate that the signal path of the at least one antenna is at least partially blocked.

20. The wireless communication device of claim 12, wherein the user interface is further configured to output the indication by:
    generating a light alert to indicate that the signal path of the at least one antenna is at least partially blocked.

21. The wireless communication device of claim 12, wherein the processor is further configured to:
    receive an instruction to orient the wireless communication device such that the signal path of the at least one antenna is not blocked by the object, the instruction including at least one of the first instruction or the second instruction, and
    wherein the user interface is further configured to output the indication by displaying the instruction.

22. The wireless communication device of claim 12, wherein the user interface is further configured to output the indication based on a determination that the at least one antenna is in an active operational state.

23. The wireless communication device of claim 12, further comprising:
    a radio frequency integrated circuitry (RFIC) component including the at least one antenna,
    wherein the information is received from the RFIC component.

24. A non-transitory computer-readable medium having program code recorded thereon, the program code comprising:
    code for causing a wireless communication device to receive information associated with at least one antenna of the wireless communication device indicating that a signal path of the at least one antenna is at least partially blocked by an object; and
    code for causing a user interface of the wireless communication device to output an indication that the signal path of the at least one antenna is at least partially blocked, the indication including at least one of a first instruction to rotate the wireless communication device along one or more axes or a second instruction to translate the wireless communication device along one or more axes.

25. The non-transitory computer-readable medium of claim 24, wherein the code for causing the user interface of the wireless communication device to outputting the indication is further configured to:
    display a graphical representation of the wireless communication device with a visual indicator indicating a position of the at least one antenna on the graphical representation of the wireless communication device.

26. The non-transitory computer-readable medium of claim 24, wherein the code for causing the user interface of the wireless communication device to output the indication is further configured to:
    generate at least one of an audio alert, a vibration alert, or a light alert to indicate that the signal path of the at least one antenna is at least partially blocked.

27. The non-transitory computer-readable medium of claim 24, further comprising:
    code for causing the wireless communication device to receive an instruction to orient the wireless communication device such that the signal path of the at least one antenna is not blocked by the object, the instruction including at least one of the first instruction or the second instruction; and
    code for causing the user interface of the wireless communication device to display the instruction to orient the wireless communication device.

28. The non-transitory computer-readable medium of claim 24, wherein the code for causing the wireless communication device to receive the information is further configured to receive the information associated with an array of antennas including the at least one antenna, the information indicating that the signal path of the array of antennas is at least partially blocked.

* * * * *